United States Patent Office 3,580,926
Patented May 25, 1971

3,580,926
CARBAZOLE-4-ALKANOIC ACIDS AND TETRAHYDROCARBAZOLE-4-ALKANOIC ACIDS
Franklin W. Short, Saline, Mich., assignor to Parke, Davis & Company, Detroit, Mich.
No Drawing. Filed Nov. 10, 1969, Ser. No. 875,559
Int. Cl. C07d 27/68
U.S. Cl. 260—315
5 Claims

ABSTRACT OF THE DISCLOSURE 9-phenylcarbazole-4-acetic acid and 5,6,7,8-tetrahydro-9-phenylcarbazole-4-acetic acid; o-fluoro, o-chloro, and α-methyl derivatives; and carboxylate salts of the foregoing compounds. The products are anti-inflammatory agents useful in relieving or preventing inflammation. They can be produced from the corresponding lower alkyl esters by hydrolysis. The intermediates can be produced from hexahydrodibenzofuran-1(2H)-one by reaction with aniline or a substituted aniline, introduction of an alkanoic acid ester side-chain, and dehydrogenation in the ring system.

SUMMARY AND DETAILED DESCRIPTION

The present invention relates to new alkanoic acid compounds. More particularly, the invention relates to certain carbazole-4-alkanoic acids and tetrahydrocarbazole-4-alkanoic acids, to salts thereof, and to methods for the production of the foregoing compounds. In the form of the free carboxylic acids, the compounds of the invention can be represented by the formula

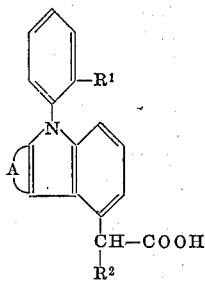

In this formula, $R^1$ represents hydrogen, fluorine, or chlorine; $R^2$ represents hydrogen or methyl; and A represents a group of the formula

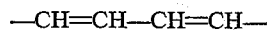

—CH=CH—CH=CH— or a group of the formula

—CH$_2$—CH$_2$—CH$_2$—CH$_2$—

With reference to the definition of the term A, the compounds of the first formula given above are respectively 9-arylcarbazole-4-alkanoic acids and 5,6,7,8-tetrahydro-9-arylcarbazole-4-alkanoic acids.

In accordance with the invention, the compounds of the foregoing formula and their salts can be produced by reacting a compound of the formula

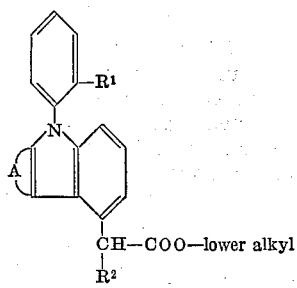

with a hydrolytic agent; where $R^1$, $R^2$, and A are as defined before. The lower alkyl group preferably contains not more than 6 carbon atoms and can be either substituted or unsubstituted. The hydrolytic agent is water or an aqueous medium, containing a base or an acid. Basic conditions are preferred. Some examples of suitable bases are alkali metal hydroxides, alkaline earth metal hydroxides, alkali metal carbonates, alkali metal alkoxides, and trialkylammonium hydroxides. A preferred base is sodium hydroxide or potassium hydroxide. Some examples of suitable acids are mineral acids and strong organic acids such as benzenesulfonic acid. A solvent in addition to water can be, and usually is, present. Some examples of suitable solvents are lower alkanols, dioxane, tetrahydrofuran, ethylene glycol, propylene glycol, and diethylene glycol dimethyl ether. A preferred solvent is aqueous ethanol. A considerable excess of the hydrolytic agent is normally used. The time and temperature of the reaction are not particularly critical. In general, the reaction is carried out at a temperature from about 0 to 120° C. or the reflux temperature of the solvent for from about 30 minutes to 60 hours, with the shorter times being used at the higher temperatures. With the preferred basic conditions, the usual reaction conditions are from 25 to 100° C. or the reflux temperature of the solvent for from 2 to 20 hours. The product is isolated either as the free carboxylic acid or as a carboxylate salt by adjustment of the pH as necessary. The products in which $R^2$ represents methyl can also be obtained in either racemic, or, by resolution, optically-active $d$- and $l$-forms.

Starting materials required for use in the foregoing process can be prepared by any of a variety of methods, as illustrated in greater detail hereinafter. For example, 3,4,6,7,8,9-hexahydrodibenzofuran-1(2H)-one is reacted with a compound of the formula

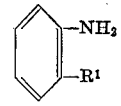

to produce a 1,2,5,6,7,8-hexahydro-9-arylcarbazol-4(3H)-one of the formula

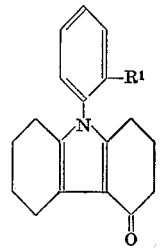

This compound is reacted under anhydrous conditions with zinc and a bromo ester of the formula

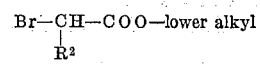

Br—CH—COO—lower alkyl
|
$R^2$ and the product hydrolyzed whereby dehydration occurs with the production of a compound of the formula

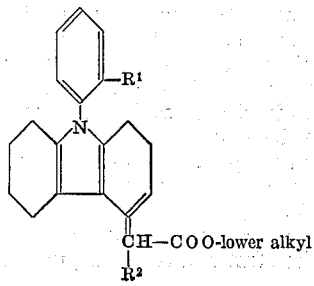

or of the formula

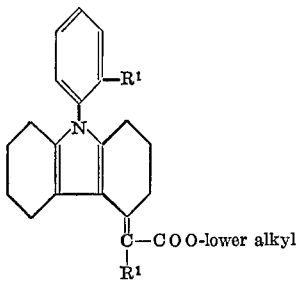

In these formulas, R¹, R², and lower alkyl are as defined before, and the double bond is primarily exo ($\Delta^{4,\alpha}$) when R² is hydrogen; and primarily endo ($\Delta^{3,4}$) when R² is methyl. However, either dehydration product or a mixture of the two is suitable and essentially equivalent for the purposes of the next reaction, which is a dehydrogenation with sulfur. By using 3 molar equivalents of sulfur, the product is a 9-arylcarbazole-4-alkanoic acid ester. By using only one molar equivalent of sulfur, the product is a 5,6,7,8-tetrahydro-9-arylcarbazole-4-alkanoic acid ester. Either of these is a suitable starting material for use in the foregoing process of the invention.

The free carboxylic acids of the invention form carboxylate salts with any of a variety of inorganic and organic bases. Pharmaceutically-acceptable salts are formed with such bases as sodium hydroxide, potassium hydroxide, calcium hydroxide, sodium carbonate, potassium bicarbonate, ammonia, diethylamine, 2-hydroxyethylamine, and choline. The preferred carboxylate salts of the invention are the pharmaceutically-acceptable salts of an alkali metal, an alkaline earth metal, ammonia, or a substituted ammonia. The carboxylic acids and their salts are interconvertible by adjustment of the pH. They differ in solubility properties but are otherwise equivalent for the purposes of the invention.

The compounds of the invention are new chemical compounds of value as pharmacological agents and as chemical intermediates. They are anti-inflammatory agents useful in the relief of inflammatory conditions as well as in the prevention or suppression of the occurrence of inflammation. Their activity can be demonstrated and measured in a standard laboratory test using depilated guinea pigs. In this test procedure animals are given a selected dose of a test compound and these treated animals and untreated controls are subjected to an exposure of ultraviolet radiation sufficient to cause erythema in the untreated animals. An effective dose of an active compound produces a statistically significant degree of protection against the development of erythema. In this test, 9-phenylcarbazole-4-acetic acid was rated active at an oral dose of 0.4 mg./kg. 9-(o-fluorophenyl)carbazole-4-acetic acid was rated active at an oral dose of 0.8 mg./kg. The compounds are preferably administered by the oral route although parenteral administration can also be used. As anti-inflammatory agents, the preferred compounds of the invention are those having the carbazole rather than the tetrahydrocarbazole ring system.

The invention is illustrated by the following examples.

EXAMPLE 1

A solution of 16.9 g. of methyl 9-phenylcarbazole-4-acetate, 10 g. of 50% aqueous sodium hydroxide, and 300 ml. of ethanol is heated at reflux for 4 hours and concentrated almost to dryness. The residue is dissolved in 300 ml. of water and the solution acidified with 80 ml. of 6 N hydrochloric acid. The insoluble product, 9-phenylcarbazole-4-acetic acid, is collected on a filter. For purification the product is dissolved in benzene and the solution poured on a chromatography column prepared with 400 g. of silica gel. The column is eluted with benzene and with benzene containing increasing proportions of ether. The fractions containing the product (eluted with 10% and 20% solutions of ether in benzene) are evaporated and the residues are combined and dissolved in methanol. The methanol solution is stirred with charcoal, filtered, and evaporated. The residue is crystallized twice from benzene-hexane to give the purified product; M.P. 144–148° C.

In the same manner, from methyl 5,6,7,8-tetrahydro-9-phenylcarbazole-4-acetate, the product is 5,6,7,8-tetrahydro-9-phenylcarbazole-4-acetic acid. The product is purified by chromatography on silica gel and crystallization from benzene-hexane; M.P. 154–158° C.

In the same manner, from ethyl 9-(o-fluorophenyl)-α-methylcarbazole-4-acetate, the product is 9-(o-fluorophenyl)-α-methylcarbazole-4-acetic acid. For purification the crude product is extracted with boiling cyclohexane and the soluble material is recovered by evaporation of the solution and crystallized from benzene-hexane; M.P. 151–153.5° C.

In the same manner, from methyl 9-(o-chlorophenyl)-carbazole-4-acetate, the product is 9-(o-chlorophenyl) carbazole-4-acetic acid. The crude product is fractionated by chromatography on silica gel in the manner described above and recovered by evaporation of the eluates. It is then extracted with boiling cyclohexane, recovered by evaporation of the solution, and crystallized from ethanol-water and benzene-cyclohexane to give the purified product; M.P. 184–186° C.

In the same manner, from ethyl 9-(o-chlorophenyl)-α-methylcarbazole-4-acetate, the product is 9-(o-chlorophenyl)-α-methylcarbazole-4 - acetic acid. The purified product is obtained by chromatography on silica gel, extraction with boiling cyclohexane, and crystallization from benzene-cyclohexane in the manners described above; M.P. 172–174.5° C.

A solution of 3.01 g. of 9-phenylcarbazole-4-acetic acid in 50 ml. of methanol is treated with 0.69 g. of potassium carbonate in portions and the resulting mixture heated at reflux for 30 minutes. It is then distilled under reduced pressure to give a residue of 9-phenylcarbazole-4-acetic acid, potassium salt.

A solution of 1.5 g. of ammonia in 10 ml. of ethanol is added to a hot solution of 3.0 g. of 9-phenylcarbazole-4-acetic acid in 30 ml. of ethanol. The solvent is evaporated to give a residue of 9-phenylcarbazole-4-acetic acid, ammonium salt.

The sodium, diethylamine, and 2-hydroxyethylamine salts are obtained by reacting 9-phenylcarbazole-4-acetic acid with sodium hydroxide, diethylamine, and 2-hydroxyethylamine respectively.

A solution of 3.05 g. of 5,6,7,8-tetrahydro-9-phenylcarbazole-4-acetic acid in 25 ml. of hot ethanol is treated with 10 ml. of 1 N aqueous sodium hydroxide. The mixture is evaporated under reduced pressure to give a residue of 5,6,7,8-tetrahydro-9-phenylcarbazole-4-acetic acid, sodium salt.

A solution of 1.4 g. of choline chloride in 10 ml. of methanol is added to 3.27 g. of 5,6,7,8-tetrahydro-9-phenylcarbazole-4-acetic acid, sodium salt in 50 ml. of methanol. The mixture is stirred for one hour and filtered to remove insoluble sodium chloride. The filtrate is evaporated to dryness under reduced pressure to give a residue of 5,6,7,8 - tetrahydro-9-phenylcarbazole-4-acetic acid, choline salt.

EXAMPLE 2

A solution of 39.2 g. of ethyl α-methyl-9-phenylcarbazole-4-acetate and 19.3 g. of 50% aqueous sodium hydroxide in 400 ml. of ethanol is heated at reflux for 5 hours and concentrated almost to dryness. The residue is dissolved in water and the solution is washed with ether and acidified. The acidified aqueous mixture is extracted with ether and the ether extract is dried and evaporated to give an oily residue of α-methyl-9-phenylcarbazole-4-aectic acid. For purification this product is dissolved in benzene and the solution poured on a chromatography column prepared with 900 g. of silica gel. The column is eluted with benzene and with benzene containing small proportions of ether. The fractions containing the product (eluted with 10% ether in benzene) are evaporated. The residues are combined and crystallized from hexane and then from aqueous ethanol to give the purified product; M.P. 124–125.5° C.

In the same manner, from methyl 5,6,7,8-tetrahydro-α-methyl-9-phenylcarbazole-4-acetate, the product is 5,6,7,8-tetrahydro-α-methyl-9-phenylcarbazole-4 - acetic acid. The product is purified by chromatography on silica gel and crystallization from aqueous ethanol; M.P. 173–175° C.

In the same manner, from methyl 9-(o-fluorophenyl)-carbazole-4-acetate, the product obtained is 9-(o-fluorophenyl)carbazole-4-acetic acid. The product is purified by chromatography on silica gel and crystallizations from aqueous ethanol; M.P. 164–166° C.

Each of the above products is converted to the sodium, potassium, and ammonium salt by reaction with sodium carbonate, potassium hydroxide, and ammonia respectively.

Starting materials

A stirred mixture of 63.2 g. of 3,4,6,7,8,9-hexahydro-dibenzofuran-1(2H)-one, 123.5 g. of aniline, and 6 g. of aniline hydrochloride is heated at reflux for 8 hours. It is then poured into 300 ml. of concentrated hydrochloric acid containing 300 g. of ice. The resulting mixture is extracted with chloroform and the chloroform extract is washed with 1 N hydrochloric acid, with water, and with saturated sodium chloride solution, dried over anhydrous sodium sulfate, and evaporated. The product is purified by crystallizations from aqueous ethanol to give 1,2,5,6,7,8 - hexahydro - 9 - phenylcarbazol-4(3H)-one; M.P. 177.5–180° C.

A stirred mixture of 92.2 g. of 3,4,6,7,8,9-hexahydro-dibenzofuran-1(2H)-one, 222 g. of o-fluoroaniline, and 5 g. of o-fluoroaniline hydrochloride is heated at reflux for 6 days, cooled, and poured into 3 N hydrochloric acid. The insoluble material present is removed by filtration and washed with benzene. The aqueous filtrate is extracted with benzene and the combined benzene wash and extract is washed with 1 N hydrochloric acid, with water, and with saturated sodium chloride solution, dried, and evaporated. The residual oil is dissolved in ethanol and 1 N hydrochloric acid, heated at reflux for 2 days, and concentrated almost to dryness. A slurry of the residue in benzene is filtered and the separated solid washed on the filter with benzene and with water. The aqueous portion of the filtrate is extracted with benzene and all the benzene fractions are combined and washed with water, dried, and evaporated. The residue is triturated with ethanol and the resulting slurry is filtered. The product collected on the filter is 9-(o-fluorophenyl)-1,2,5,6,7,8-hexahydrocarbazol-4(3H)-one; M.P. 131.5–135° C. In the same manner, from 3,4,6,7,8,9-hexahydrodibenzofuran-1(2H)-one, o-chloroaniline, and o-chloroaniline hydrochloride, the product is 9-(o-chlorophenyl)-1,2,5,6,7,8-hexahydrocarbazol-4(3H)-one, M.P. 160–162° C., following crystallization from benzene.

A mixture of 48.4 g. of 1,2,5,6,7,8-hexahydro-9-phenylcarbazol-4(3H)-one, 56.1 g. of methyl bromoacetate, 58.5 g. of granular, activated zinc, and 0.1 g. of iodine in 900 ml. of 1,2-dimethoxyethane is heated at reflux for 15 minutes and stirred an additional 45 minutes. Four times during the next 3 hours, an additional 7 g. of methyl bromoacetate and 14.6 g. of zinc are added. The reaction mixture is then heated at reflux for 2 hours, cooled, diluted with 1000 ml. of 10% sulfuric acid, and extracted with chloroform. The chloroform extract is washed with water and with saturated sodium chloride solution, dried over anhydrous sodium sulfate, filtered, and concentrated to dryness. In order to separate the residual mixture of starting material and product, it is heated under reflux with 31.7 g. of (carboxymethyl) trimethylammonium chloride hydrazide (Girard's Reagent T) and 31.7 ml. of acetic acid in 650 ml. of ethanol for 3 hours. Ethylene glycol (600 ml.) is added. The ethanol is removed by distillation and the resulting solution is extracted with ether. The ether extract is washed with water and with saturated sodium chloride solution, dried, and evaporated to give a residue of methyl 1,2,5,6,7,8-hexahydro-9-phenylcarbazole-$\Delta^{4(3H),\alpha}$-acetate, suitable for use without further purification.

A stirred mixture of 52.6 g. of 1,2,5,6,7,8-hexahydro-9-phenylcarbazol-4(3H)-one, 48.2 g. of ethyl 2-bromopropionate, 65.4 g. of granular, activated zinc, and 0.1 g. of mercuric chloride in 900 ml. of benzene is heated under reflux. After 30 minutes, 200 ml. of 1,2-dimethoxyethane is added and heating under reflux is continued for an additional hour. Four times during the next 30 hours, an additional 6.0 g. of ethyl 2-bromopropionate and 16.7 g. of zinc are added while heating under reflux is continued. The reaction mixture is then heated under reflux for 15 hours more, cooled, and diluted with 800 ml. of 10% sulfuric acid. The organic phase is separated, washed with water, dried over sodium sulfate, filtered, concentrated to give an oily residue of crude ethyl 1,2,5,6,7,8-hexahydro-α-methyl-9-phenylcarbazole-4-acetate, suitable for use without further purification. In the same manner, from 9 - (o - fluorophenyl) - 1,2,5,6,7,8-hexahydrocarbazol-4(3H)-one, methyl bromoacetate, and zinc, the product is crude methyl 9-(o-fluorophenyl)-1,2,5,6,7,8-hexahydrocarbazole-$\Delta^{4(3H),\alpha}$-acetate, suitable for use without further purification. In the same manner, from 9-(o-fluorophenyl) - 1,2,5,6,7,8 - hexahydrocarbazole - 4(3H)-one, ethyl 2-bromopropionate, and zinc, the product is crude ethyl 9-(o-fluorophenyl)-1,2,5,6,7,8-hexahydro-α-methylcarbazole-4-acetate, suitable for use without further purification. In the same manner, from 9-(o-chlorophenyl) - 1,2,5,6,7,8 - hexahydrocarbazol - 4(3H) - one, methyl bromoacetate, and zinc, the product obtained is crude methyl 9-(o-chlorophenyl)-1,2,5,6,7,8-hexahydrocarbazole-$\Delta^{4(3H),\alpha}$-acetate. The product is satisfactory for use following removal of unreacted starting material with Girard's Reagent T in the manner described above. In the same manner, from 9-(o-chlorophenyl)-1,2,5,6,7,8-hexahydrocarbazol-4(3H)-one, ethyl 2-bromopropionate, and zinc, the product obtained is crude ethyl 9-(o-chlorophenyl) - 1,2,5,6,7,8, - hexahydro - α - methylcarbazole-4-acetate, suitable for use without further purification.

A stirred mixture of 19.3 g. of methyl 1,2,5,6,7,8-hexahydro-9-phenylcarbazole-$\Delta^{4(3H),\alpha}$-acetate and 5.8 g. of sulfur is slowly heated to 200° C. and held at this temperature for 2 hours. The mixture is cooled and dissolved in benzene and the solution is stirred for 18 hours with Raney nickel and filtered. The filtrate is evaporated to give as residue methyl 9-phenylcarbazole-4-acetate, suitable for use without further purification.

A stirred mixture of 19.3 g. of methyl 1,2,5,6,7,8-hexahydro-9-phenylcarbazole-$\Delta^{4(3H),\alpha}$-acetate and 1.92 g. of sulfur is heated slowly to 195° C. and held at this temperature for one hour. The mixture is cooled and dissolved in benzene and the solution is stirred for 18 hours with Raney nickel and filtered. The filtrate is evaporated to give a residue of methyl 5,6,7,8-tetrahydro-9-phenylcarbazole-4-acetate, suitable for use without further purification. In the same manner, from ethyl 1,2,5,6,7,8-hexahydro-α-methyl-9-phenylcarbazole-4-acetate, the product is ethyl 5,6,7,8-tetrahydro-α-methyl-9-phenylcarbazole-4-acetate.

A stirred mixture of 39.7 g. of ethyl 1,2,5,6,7,8-hexahydro-α-methyl-9-phenylcarbazole-4-acetate and 11.2 g. of sulfur is heated slowly to 220° C. and held at this temperature for one hour. The mixture is cooled and dissolved in benzene and the solution is filtered and evaporated to give a residue of ethyl α-methyl-9-phenylcarbazole-4-acetate. In the same manner, from methyl 9-(o-fluorophenyl) - 1,2,5,6,7,8 - hexahydrocarbazole - $\Delta^{4(3H),\alpha}$ - acetate, the product is methyl 9-(o-fluorophenyl)carbazole-4-acetate. In the same manner, from ethyl 9-(o-fluorophenyl) - 1,2,5,6,7,8 - hexahydro - α - methylcarbazole-4-acetate, the product is ethyl 9-(o-fluorophenyl)-α-methylcarbazole-4-acetate. In the same manner, from methyl 9 - (o - chlorophenyl) - 1,2,5,6,7,8 - hexahydrocarbazole-Δ$^{4(3H),\alpha}$-acetate, the product is methyl 9-(o-chlorophenyl)-carbazole-4-acetate. In the same manner, from ethyl 9-(o-chlorophenyl) - 1,2,5,6,7,8 - hexahydro - α - methylcarbazole-4-acetate, the product is ethyl 9-(o-chlorophenyl)-α-methylcarbazole-4-acetate.

I claim:
1. A member of the class consisting of compounds of the formula

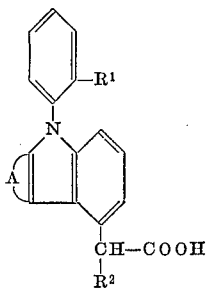

and pharmaceutically acceptable carboxylate salts thereof; where $R^1$ is a member of the class consisting of hydrogen, fluorine, and chlorine; $R^2$ is a member of the class consisting of hydrogen and methyl; and A is a member of the class consisting of a group of the formula $$-CH=CH-CH=CH-$$

and a group of the formula $$-CH_2-CH_2-CH_2-CH_2-$$

2. A compound according to claim 1 which is 9-phenylcarbazole-4-acetic acid.
3. A compound according to claim 1 which is α-methyl-9-phenylcarbazole-4-acetic acid.
4. A compound according to claim 1 which is 9-(o-fluorophenyl)carbazole-4-acetic acid.
5. A compound according to claim 1 which is 9-(o-chlorophenyl)carbazole-4-acetic acid.

FOREIGN PATENTS 183,210   8/1966   U.S.S.R. _____ 260—315

HENRY R. JILES, Primary Examiner

S. D. WINTERS, Assistant Examiner

U.S. Cl. X.R.

260—346.2; 424—274